Oct. 25, 1927.  
W. C. DE ROO ET AL  
VARIABLE SPEED MECHANISM  
Filed April 16, 1925     3 Sheets-Sheet 1

1,647,087

INVENTORS  
William C. De Roo  
James E. Larsh  
BY James N. Ramsey  
ATTORNEY

Oct. 25, 1927.

W. C. DE ROO ET AL 1,647,087

VARIABLE SPEED MECHANISM

Filed April 16, 1925 3 Sheets-Sheet 2

INVENTORS
William C. De Roo
James B Larsh

BY James N. Ramsey
ATTORNEY

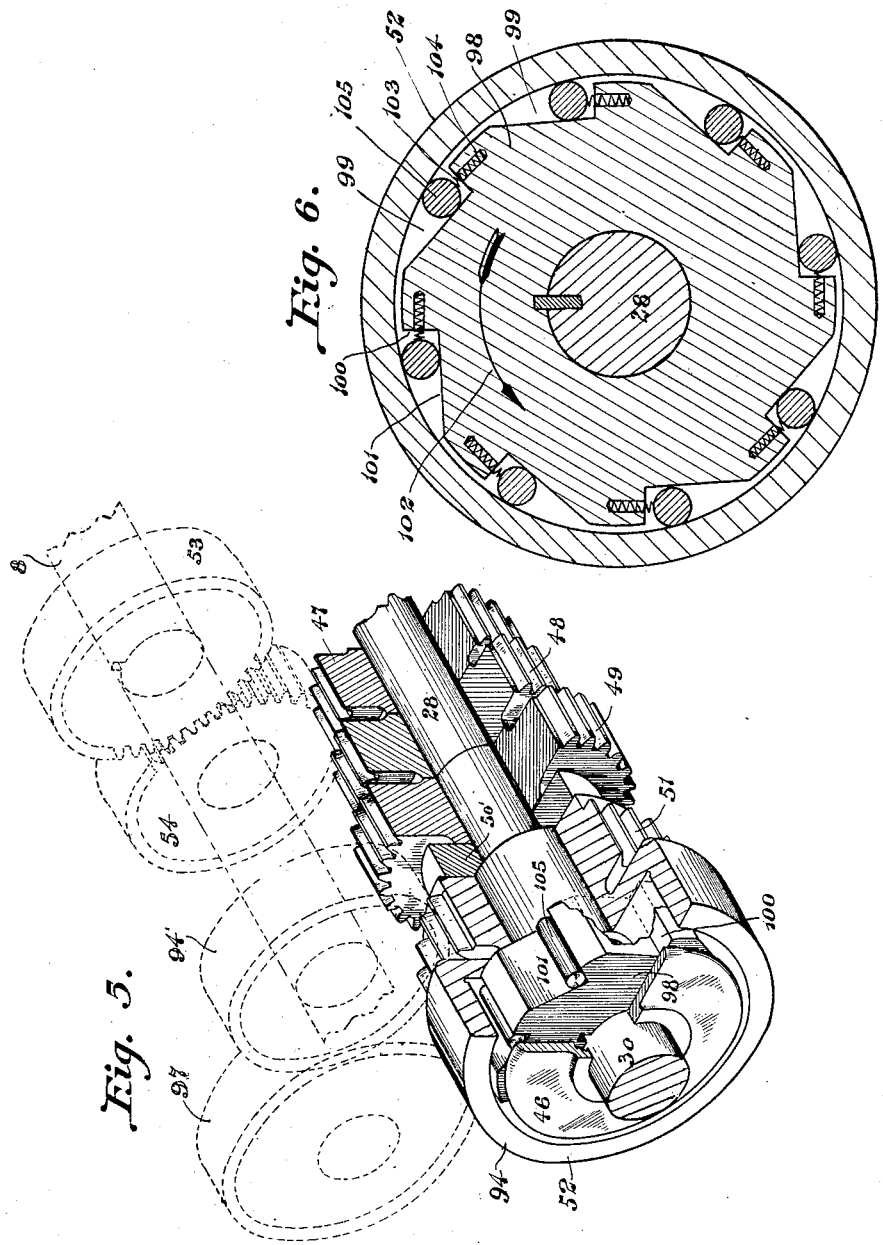

Patented Oct. 25, 1927.

1,647,087

UNITED STATES PATENT OFFICE.

WILLIAM C. DE ROO AND JAMES E. LARSH, OF CINCINNATI, OHIO, ASSIGNORS TO THE DRESES MACHINE TOOL CO., OF CINCINNATI, OHIO, A CORPORATION OF OHIO.

VARIABLE-SPEED MECHANISM.

Application filed April 16, 1925. Serial No. 23,570.

Our invention relates to variable speed mechanisms particularly, though not exclusively, adapted for use on drilling machines.

Heretofore the usual initial variable speed mechanism of a radial drilling machine comprised a box or casing having a plurality of gears therein whereby various changes of speeds are obtained as by manual operation of a hand lever which protrudes through an opening in the casing. The hand lever of this usual and well known type of speed changing mechanism is integrally or securely connected to a tumbler and the shifting of the mechanism from one gear ratio to another is accomplished by movement of said lever from one slot in the casing to another, thereby necessitating an opening of considerable size in the gear box to permit the required movement of the hand lever and requiring considerable exertion on the part of an operator as the hand contact point of the operative lever is removed a great distance from the slidable gear. The rotating gears within the gear box are adapted to splash oil through the gear box opennig onto the floor, which not only presents an unsightly appearance but is especially undesirable also for the reason that workmen, who walk upon a floor saturated with oil, are likely to slip and severely injure themselves by accidently falling into the moving machinery. Furthermore, dirt and other foreign substances are free to enter the gear box opening and mix with the oil therein, whereby the grinding compound thus formed soon wears the gears to such an extent that considerable and undesirable noises are created by the running mechanism. The opening in the gear box is particularly suited to permit the gear noises to escape with the result that the desirable feature of smooth and noiseless running machinery cannot be maintained in variable speed mechanisms employing the use of the usual open type gear box. Many other disadvantages result from the use of the usual open front gear box having a manually operative hand lever secured to the tumbler of the mechanism.

The objects of our invention are to provide a simple, economical and completely closed tumbler type of gear box whereby gear and other noises are, to a great extent, confined therein and thus effecting a smooth and noiseless running mechanism incapable of splashing oil outside the gear box; to provide manually operative means whereby the gear ratio changes may be quickly, conveniently and noiselessly accomplished without the possibility of damaging or otherwise injuring the variable speed mechanism and to provide means whereby the operating force for actuating the mechanism for changing a gear ratio is considerably reduced.

Our invention consists in providing a gear box having speed changing mechanism completely enclosed therein; in providing a tumbler, within said gear box, having a universal connection with a manually operative hand lever, whereby the various changes of gear ratios may be accomplished by manual operation of said hand lever from without said enclosed gear box and without movement of the ends of said hand lever simultaneously in the same direction.

Our invention also consists in the details of construction, and in the combination, location and arrangement of parts, as herein set forth and claimed.

In the drawings:

Fig. 5 is a perspective view of the driven shaft and mechanism with parts broken away and showing other parts of the mechanism in dotted lines; and Fig. 6 is a vertical section of the overtake clutch.

Figure 1:
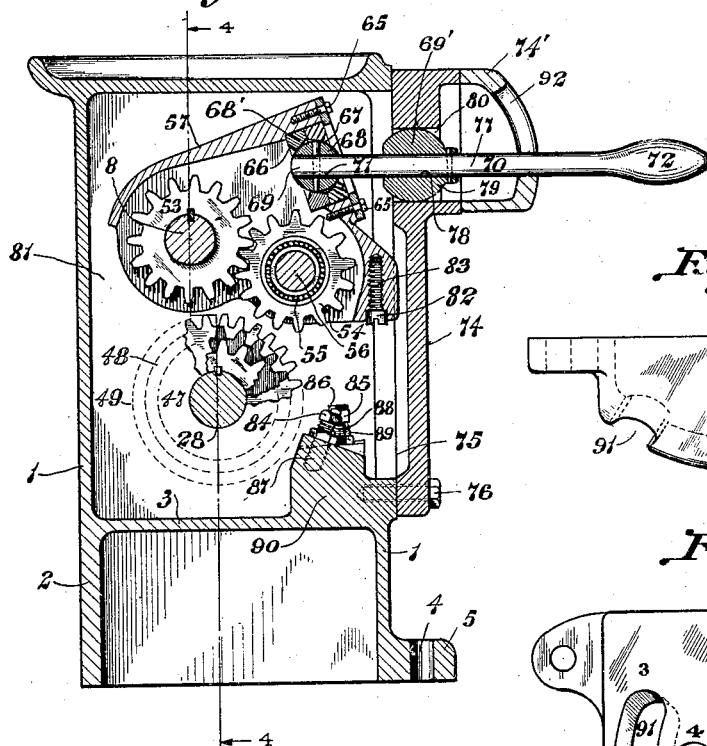
Fig. 1 is a transverse section taken on a line corresponding to line 1—1 in Fig. 4.
Figure 2:
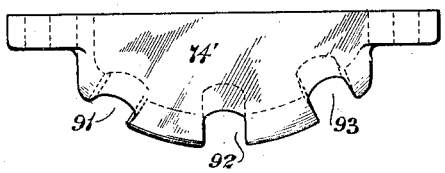
Fig. 2 is a plan view of the front plate.
Figure 3:
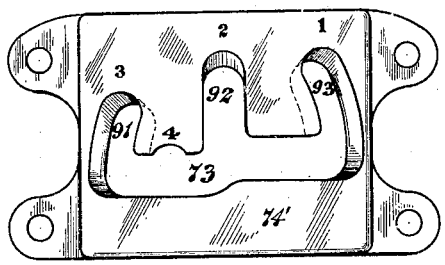
Fig. 3 is a front elevation of the same.
Figure 4:
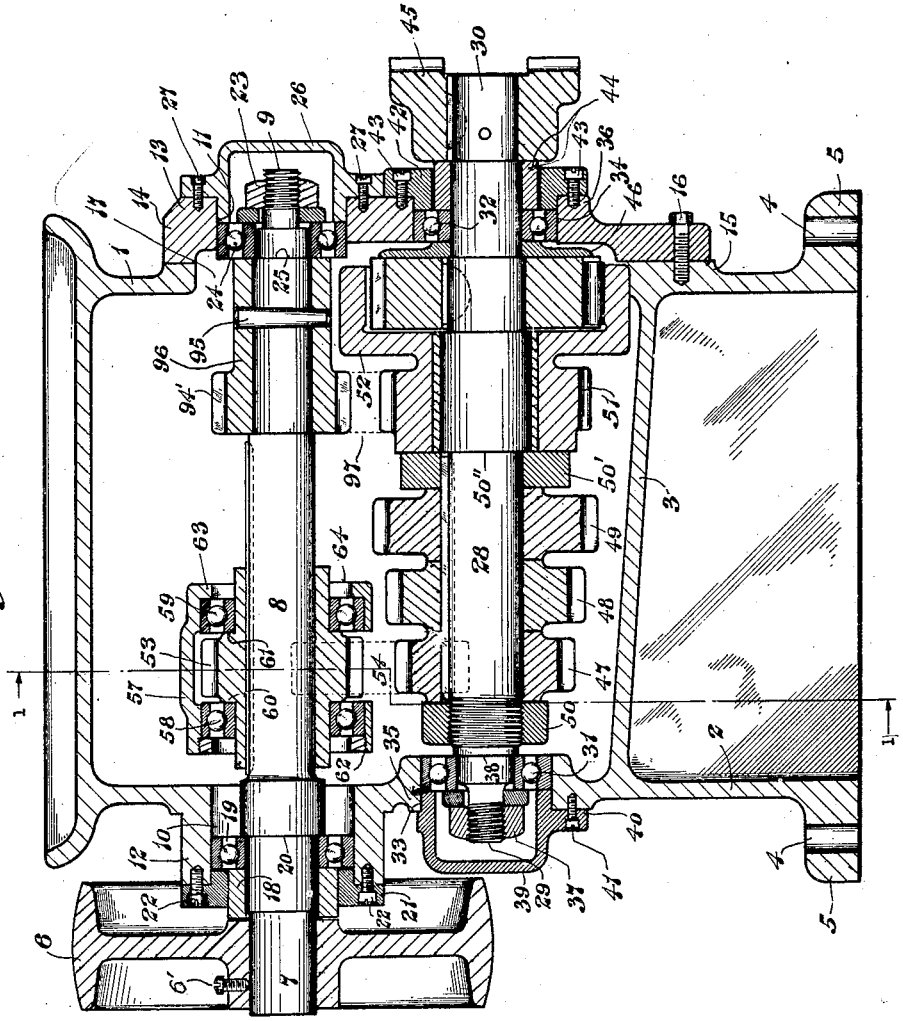
Fig. 4 is a longitudinal section taken on a line corresponding to 4—4 in Fig. 1.

In the preferred construction of our invention we provide variable speed mechanism casing 1 having support 2 integral with its bottom 3 whereby the casing may be secured to the floor or other support, as by suitable screws received by holes 4 in webs 5 of support 2.

Pulley 6 has usual belt connection with suitable outside source of power supply and is fixed to protruding end 7 of driving shaft 8 by set screw 6'. Ends 7 and 9, respectively, of driving shaft 8 are journaled in holes 10 and 11 of bosses 12 and 13, integral with casing 1 and cover or end plate 14, respectively. End plate 14 is secured to end 15 of casing 1 by screws 16 for the combined purpose of closing opening 17 in the casing and to support parts of the mechanism described hereinafter. Spacing collar 18 embracing end 7 of the driving shaft is positioned intermediate pulley 6 and annular bearing 19 positioned around the driving shaft and maintained against inward movement by circumferential shoulder 20 of the driving shaft. The annular bearing is maintained against outward movement by collar 21 secured to the outer end surface of boss 12 by screws 22. The other end 9 of the driving shaft has nut 23 threaded thereto in engagement with the outer side of annular bearing 24 positioned around end 9 of the driving shaft and maintained against inward movement by shoulder 25 of the driving shaft. The outer periphery of annular bearing 24 is fitted into hole 11 in end plate 14 which has dust cap 26 fitted therein and extending thereover. The dust cap is secured to the end plate by screws 27 whereby dust and other foreign substances are excluded from entering the casing through hole 11.

Driven shaft 28 positioned in spaced apart relation and extending parallel to driving shaft 8 has its ends 29 and 30, respectively, rotatably mounted in annular bearings 31 and 32, respectively, mounted in holes 33 and 34, respectively, in bosses 35 and 36, respectively, integral with casing 1 and end plate 14, respectively. Nut 37 threaded to end 29 of driven shaft 28 maintains annular bearing 31 against outward movement. Shoulder 38 of the driven shaft maintains annular bearing 31 against inward movement relative to the driven shaft. Dust cap 39 has shoulder 40 in engagement with the casing and is fitted and secured in hole 33 by screw 41 for excluding dust and other foreign substances from entering the casing through hole 33. Annular bearing 32 is maintained against outward movement by collar 42 secured to the outer side of end plate 14 by screws 43. Spacing collar 44 positioned around the driven shaft is intermediate annular bearing 32 and coupling member 45 keyed to protruding end 30 of driven shaft 28. The annular bearing 32 is maintained against inward movement by roller plate 46, more fully described hereinafter.

Driven gears 47, 48 and 49 keyed to driven shaft 28 are each of different ratios and are maintained in contact and frictional engagement with one another on one side by nut 50 threaded to end 29 of the driven shaft and in engagement with gear 47 and on the other side by spacing collar 50' mounted, on the driven shaft, intermediate and in contact with driven gear 49 and shoulder 50" of shaft 28, adjacent to clutch gear 51 integral with clutch hub 52 rotatably mounted on the driven shaft.

Driving gear 53 splined on driving shaft 8 is in permanent mesh with idler or intermediate gear 54 rotatably mounted on annular bearing 55 mounted on shaft 56 suitably mounted in tumbler 57 having driving gear 53 rotatably mounted on annular bearings 58 and 59, respectively, engaging shoulders 60 and 61 of the driving gear, whereby horizontal movement of the driving gear relative to bearings 58 and 59 is prevented. Outward movement of annular bearing 58 relative to the tumbler is prevented by a suitable nut threaded to the inside 62 of the tumbler. Outward movement of bearing 59 is prevented by inwardly extending flanges 63 integral with side 64 of tumbler 57 whereby movement of the tumbler longitudinally of driving shaft 8 carries with it driving gear 53 and intermediate gear 54.

Fixed to the front of tumbler 57 by screws 65 is socket member 66 having socket 67 into which is fitted rotatable ball 68 having inner end 69 of manually operative hand lever 70 suitably secured in hole 71 of the ball. The outer hand contact end 72 of the hand lever protrudes through slotted opening 73 in front face plate 74' fixed to front plate 74 fixed to front 75 of casing 1 by bolts 76. Intermediate portion 77 of hand lever 70 extends through hole 78 in ball 79 fitted into cylindrical hole or opening 80 in the front plate 74 whereby when hand lever 72 is operated ball 79 is caused to slide inwardly or outwardly relative to the casing. Ball 79 is fitted into cylindrical hole 80 for the purpose of providing smooth and non-frictional operating mechanism, as well as to a great extent confine the gear noises within enclosed casing 1 and to prevent oil 81 within casing 1 from splashing through slotted opening 73 of front plate 74 upon the outer surface of the casing and upon the surrounding floor.

The head 82 of screw 83 fixed to the lower part of tumbler 57 is adapted to contact heads 84, 85 and 86, respectively, of screws 87, 88 and 89, fixed in inner web 90 integral with casing 1. The screws 87, 88 and 89, respectively, are spaced apart a distance equal to the distance from center to center of driven gears 47, 48 and 49, whereby manual operation of hand lever 70 in the desired slot 91, 92 or 93, respectively, meshes intermediate gear 54 with driven gears 49, 48 and 47 and contacts head 82 of bolt 83 with the respective heads 86, 85 and 84, respectively, of bolts 89, 88 and 87 and thereby maintains intermediate gear 54 in proper meshing relation with the respective driven gears.

For the purpose of maintaining continuous rotation of driven shaft 28 when the position of hand lever 70 is being changed from slot 91, 92 or 93 and when intermediate gear 54 is out of mesh with all driven gears 47, 48 and 49, we provide (in combination with other fully explained mechanism) overtake clutch mechanism 94 comprising pinion 94' secured to driving shaft 8 by pin 95 combinedly received through hub 96 of the pinion and through the driving shaft.

Pinion 94' is in permanent mesh with intermediate gear 97 suitably mounted on a stud (not shown) journaled in end plate 14 of casing 1. The intermediate gear 97 is in permanent mesh with clutch gear 51 rotatably mounted on driven shaft 28 and having cylindrical hub 52 integral therewith. Inside the hub 52 and keyed to driven shaft 28 is roller carrier 98 having a plurality of equal distance and spaced apart notches 99 in its outer periphery. Each notch comprises surface 100 extending toward the axial center of roller carrier 98 and at right angles to surface 101 of the notch, as shown in Fig. 6 or, in other words, the radial surface 100 and the surface 101 perpendicular to it, together form an L-shaped notch. The relative position of the extended direction of the notches is dependent upon the required direction of rotation of driven shaft 28, as indicated by arrow 102 in Fig. 6. Tension springs 103, respectively, seated in holes 104, respectively, extend at right angles from L's 100, respectively, of notches 99 and into roller carrier 98. The springs 103 are for the purpose of maintaining rollers 105 in wedged or contacting relation with L's 101 of the notched surfaces of the roller carrier and the inner periphery of hub 52 whereby when intermediate gear 54 is in disengaged meshed relation with driven gears 47, 48 and 49 the driving shaft 8 imparts rotary movement to pinion 94' which, through intermediate gear 97 and clutch gear 51, imparts rotary movement to hub 52 which in turn imparts rotary movement to roller carrier 98 through wedging engagement of rollers 105 with the roller carrier and hub 52 whereby a continuous forward movement of driven shaft 28, keyed to roller carrier 98, is maintained irrespective of the position of lever 70.

The rollers 105 are prevented from sliding transversely from notches 99 by hub 52 on one side and by roller plate 46 on the other side.

The mechanical operations of my invention are as follows:

Assume that pulley 6 fixed to driving shaft 8 is rotated by suitable outside source of power and that hand lever 70 is in neutral position, as shown in Fig. 1. Clutch hub 52 is rotated as by intermediate gear 97 being in permanent mesh with pinion 94' (fixed to driving shaft 8) and clutch gear 51. The clutch gear 51 is integral with hub 52 rotatably mounted on driven shaft 28, whereby through wedging engagement of rollers 105 with L's 101 (of the notched surface of roller carrier 98) and the inner periphery of hub 52 the carrier is caused to rotate and whereby rotary movement is imparted to driven shaft 28, thereby maintaining operation of the mechanism of the machine in which my invention is incorporated while hand lever 70 is in a neutral position and while the hand lever is being changed from one slot 91, 92 or 93 to another for the purpose of changing the velocity of rotation of driven shaft 28 as by a change in the gear ratios of gears 53 and 54 with gears 47, 48 and 49.

Assume that hand lever 70 is positioned in slot 93 and that the gear ratio of gears 53, 54 and 47 is undersirable and that the gear ratio of gears 53, 54 and 49 is required to secure a rate of rotation of driven shaft 28 to perform the necessary work.

Hand lever 70 is manually pressed downwardly and into the bottom of horizontal slot 73 in front plate 74, whereby the hand lever being fulcrumed, as by ball 79 rotatably mounted in cylindrical hole 80 in the front plate, the inner end 69 of the hand lever is caused to move upwardly and carry with it the front part of tumbler 57 having gear 54 secured therein, thereby raising gear 54 out of meshing engagement with driven shaft gear 47. The ball 79 is caused to slide inwardly in hole 80 during the operation of lowering hand lever 70 in slot 91 for the reason that ball 68, fixed to inner end 69 of lever 70 rotates in socket 67 of support 66 and gear 53 fixed to tumbler 57 rotates on driving shaft 8. It is conversely true also that when end 72 of hand lever 70 is moved upwardly that ball 79 slides inwardly in cylindrical hole 80 due to the movement of tumbler 57 and of the rotation of ball 68 in socket 67. Hand lever 70 is then slid in horizontal slot 73 toward slot 92, thereby simultaneously imparting a horizontal rotatable movement to ball 79 and sliding it outwardly into cylindrical hole 80. Through rotation of ball 68 in socket 67 of support 66 the tumbler 57 is moved in a direction toward the vertical plane of driven gear 48 and carries with it driving gear 53 and intermediate gear 54. When hand lever 70 is directly under slot 92 intermediate gear 54 is in a vertical plane over driven gear 48 and then hand lever 70 is elevated into the top of slot 92 whereby through operation of the mechanism explained intermediate gear 54 is lowered in meshing engagement with driven gear 48, thereby imparting a higher rate of rotation to driven shaft 28, whereby the rate of rotation of roller carrier 98 is increased thereby releasing the wedging engagement of rollers 105 with roller carrier 98 and overtake clutch hub 52 and thereby permitting driven shaft 28 to travel unhampered at the increased rate of rotation.

Hand lever 70 may be manually operated and positioned in either slot 91, 92 or 93 in front plate 74 for meshing intermediate gear 54 with driven shaft gears 47, 48 and 49, whereby as many different rates of rotation may be imparted through driving shaft 8 to driven shaft 28 (exclusive of the overtake clutch imparted rate of rotation to the driven shaft) as there are driven shaft gears capable of being meshed with intermediate gear 54. A suitable variation of the various rates of rotation of driven shaft 28 may be obtained by varying the gear ratios of gears 53 and 54 with driven shaft gears 47, 48 and 49 and which variation of rotatable speed of the driven shaft may be accomplished by changing the size of the gears 53 and 54 or by changing the size of driven shaft gears 47, 48 and 49 or by changing the sizes of all gears 53, 54, 47, 48 and 49.

It is apparent that we have invented a practical and highly desirable means for conveniently changing the gear ratio of variable speed mechanism or of the main driving shaft (herein referred to as driven shaft 28) of a radial drilling machine.

An important object of applicants' invention is to provide a rapid and noiselessly operated device for the purposes intended and which is completely and effectively enclosed in a dust proof casing, whereby the radial drilling machine itself, as well as the surrounding floor, can be kept easily in a perfectly clean, attractive and sanitary condition and without the usual disadvantage of having oil splash from the gear box upon the machine and surrounding objects. Furthermore, the operation of our invention is extremely simple and a change of the gear ratio between the driving shaft and the driven shaft 28 can be accomplished quickly and noiselessly and with but slight exertion on the part of the operator. Advantageous results are obtained particularly by the use of the ball and socket or universal joints 68' and 79', the mechanism of the preferred construction being thoroughly explained herein, which permits smooth and almost non-frictional operation of the gear changing mechanism, and which broadly comprises fulcruming hand lever 70 intermediate its end portions for actuating tumbler 57. It is thereby possible to effect a gear ratio change in our invention with considerably less manual exertion of the operator than is required when making a gear ratio change in other and usual types of devices of this nature.

The importance of having the gear box completely enclosed whereby dirt and other foreign matter is excluded from the interior mechanism, as well as preventing oil from escaping from within the gear box to the outside thereof, results in materially lengthening the life of the mechanism, and the operator of the machine is enabled to keep himself and the machine in a cleanly condition, whereby through the effects of desirable environment high efficiency in the work of the employees results.

Another important object of our invention is the contruction of variable speed mechanism in accordance with the present endeavors of all progressive manufacturing firms to operate only such machines as have minimum likelihood of causing injury to the employees.

While we have chosen to illustrate the form and construction of our invention by the accompanying drawings and explanations of the same, we desire to emphasize particularly the fact that the form and explanations, as relates thereto, are not intended to include all of the structures in which our invention may be incorporated. It is understood that our invention resides in the combination and arrangement of parts and in the details of construction, as hereinafter claimed, and that changes in the precise embodiment of the invention, as herein disclosed, can be made within the scope of what is claimed without departing from the spirit of the invention.

What we claim as new and desire to secure by Letters Patent is:

1. In a device of the class described, a casing having an opening therein, a hand lever slidably fulcrumed in said opening, a tumbler mounted in said casing, and a universal joint connecting said tumbler with said hand lever to move said tumbler longitudinally and oscillatorily, substantially as and for the purposes specified.

2. In a device of the class described, a casing having an opening therein, a hand lever slidably fulcrumed in said opening, a tumbler mounted in said casing, and a ball and socket joint connecting said tumbler with said hand lever to move said tumbler longitudinally and oscillatorily substantially as and for the purposes set forth.

3. In a device of the class described, a casing having an opening therein, a driving shaft rotatably mounted in said casing, a tumbler mounted on said driving shaft, a hand lever slidably fulcrumed in said opening, whereby said opening is completely closed, and a universal joint connecting said hand lever with said tumbler whereby said tumbler is adapted to be oscillated and slid longitudinally of said driving shaft, substantially as and for the purposes set forth.

4. In a device of the class described, a casing having an opening therein, a hand lever slidably fulcrumed in said opening whereby movement of said hand lever actuates its ends in opposite directions, a shaft rotatably mounted in said casing, a tumbler slidably mounted on said shaft, and a universal joint connecting said hand lever with said tumbler whereby said tumbler is adapted to be oscillated and moved longitudinally of said shaft.

5. In variable speed mechanism, a casing, a driving shaft rotatably mounted in said casing, a driving gear splined on said driving shaft, a tumbler oscillatorily secured to said driving gear, an intermediate gear rotatably mounted in said tumbler and in permanent mesh with said driving gear, a driven shaft, a plurality of driven gears keyed to said driven shaft, and a manually operative hand lever slidably fulcrumed in said casing, and having universal connection with said tumbler, whereby operation of said hand lever is adapted to mesh said intermediate gear with any one of said driven gears, substantially as described.

6. In variable speed mechanism, a casing having a cylindrical opening therein, a manually operative hand lever, an intermediate ball fixed to said lever and positioned in said cylindrical opening, a tumbler having a socket therein, a ball fixed to the inner end of said lever and rotatably mounted in said socket, a driving shaft, a driving gear splined on said driving shaft and rotatably secured to said tumbler, an intermediate gear rotatably mounted in said tumbler and in permanent mesh with said driving gear, a driven shaft, and a driven gear keyed to said driven shaft, whereby manual operation of said lever is adapted to mesh said intermediate gear with said driven gear, substantially as described.

7. In variable speed mechanism, a casing having a bearing therein, a driving shaft, a driving gear splined on said driving shaft, a tumbler oscillatorily secured to said driving gear, an intermediate gear rotatably mounted in said tumbler and in permanent mesh with said driving gear, a driven shaft, a plurality of driven gears keyed to said driven shaft, a manually operated hand lever, an intermediate ball fixed to said lever and slidably positioned and pivoted in said bearing, and a universal joint connecting said lever with said tumbler, whereby manual operation of said lever is adapted to mesh said intermediate gear with any of said driven gears, substantially as described.

8. In variable speed mechanism, a casing having a bearing therein, a driving shaft mounted in said casing, a driving gear splined on said driving shaft, a tumbler oscillatorily secured to said driving gear and having a socket therein, an intermediate gear rotatably mounted in said tumbler and in permanent mesh with said driving gear, a driven shaft, a plurality of driven gears keyed to said driven shaft, a manually operative hand lever, an intermediate ball fixed to said hand lever and pivotally and slidably positioned in said bearing, and an end ball fixed to said lever and rotatably mounted in said socket, whereby manual operation of said lever is adapted to mesh said intermediate gear with one of said driven gears, substantially as described.

9. In variable speed mechanism, a casing, a slotted front plate fixed to the front of said casing and having a cylindrical hole therein, a driving shaft rotatably mounted in said casing, a driving gear splined on said driving shaft, a tumbler oscillatorily secured to said driving gear and having a socket therein, an intermediate gear rotatably mounted in said tumbler and in permanent mesh with said driving gear, a driven shaft, a plurality of driven gears keyed to said driven shaft, a manually operative hand lever extending through said slotted opening, a ball fixed to said lever and slidably positioned in said front plate, and an end ball fixed to said lever and rotatably mounted in said socket whereby operation of said lever is adapted to mesh said intermediate gear with said driven gears, respectively, substantially as described.

10. In variable speed mechanism, a casing, a driving shaft mounted therein, a driven shaft rotatably mounted in said casing, a plurality of driven gears fixed to said driven shaft, a driving gear splined on said driving shaft, a tumbler connected with said driving gear, an intermediate gear rotatably mounted in said tumbler and in permanent mesh with said driving gear, and a manually operative hand lever slidably fulcrumed in said casing and having its inner end universally connected with said tumbler, whereby manual operation of said lever is adapted to mesh said intermediate gear with said driven gears, respectively.

11. In variable speed mechanism a casing, a bearing therein, a driving shaft rotatably mounted in said casing, a pivoted tumbler having a socket therein, a driving gear secured in said tumbler and splined on said driving shaft, an intermediate gear rotatably mounted in said tumbler and in permanent mesh with said driving gear, a manually operative hand lever, a ball fixed to the intermediate portion of said lever and positioned in said bearing in said casing, and a ball fixed to the inner end of said hand lever and rotatably mounted in said socket, whereby manual operation of said lever is adapted to elevate and lower said intermediate gear in and out of mesh with said gears, respectively.

12. In variable speed mechanism, a driving shaft, a pivoted tumbler having a socket therein, a driving gear splined on said shaft and secured to said tumbler, a ball pivotally mounted in said socket, a hand lever fixed to said ball, a bearing for said hand lever, a driven shaft, a driven gear keyed thereto, and an intermediate gear mounted in said tumbler and in mesh with said driving gear and capable of meshing with said driven gear, whereby operation of said lever is adapted to mesh and unmesh said intermediate gear with said driven gear.

13. In variable speed mechanism, a casing, a driving shaft rotatably mounted in said casing, a driving gear splined on said driving shaft, a tumbler rotatably secured to said driving gear, an intermediate gear rotatably mounted in said tumbler and in mesh with said driving gear, a driven shaft, a plurality of driven gears keyed to said driven shaft, and a manually operative hand lever slidably fulcrumed in said casing, and having universal connection with said tumbler, whereby operation of said hand lever is adapted to mesh said intermediate gear with any one of said driven gears, substantially as described.

14. In variable speed mechanism, a casing having a hole therein, a manually operative pivoted hand lever, an intermediate ball fixed to said lever and positioned in said hole, a pivotally mounted tumbler having a socket therein, an end ball fixed to said lever and rotatably mounted in said socket, a driving shaft, a driving gear mounted on said driving shaft and rotatably secured to said tumbler, an intermediate gear rotatably mounted in said tumbler and in permanent mesh with said driving gear, a driven shaft, and a driven gear keyed to said driven shaft, whereby manual operation of said lever is adapted to mesh said intermediate gear with said driven gear, substantially as described.

15. In variable speed mechanism, a casing having a cylindrical hole therein, a manually operative pivoted hand lever, an intermediate ball fixed to said lever and positioned in said cylindrical hole, a pivoted tumbler having a socket therein, a ball fixed to said lever and mounted in said socket, a driving shaft, a driving gear mounted on said driving shaft and rotatably secured to said tumbler, an intermediate gear rotatably mounted in said tumbler and in permanent mesh with said driving gear, a driven shaft, and a driven gear keyed to said driven shaft and positioned in the vertical plane of said intermediate gear, whereby manual operation of said lever is adapted to mesh said intermediate gear with said driven gear, substantially as described.

16. In variable speed mechanism, a casing having a bearing therein, a driving shaft, a driving gear splined on said driving shaft, a tumbler pivotally secured to said driving gear, an intermediate gear rotatably mounted in said tumbler and in permanent mesh with said driving gear, a driven shaft, a plurality of driven gears keyed to said driven shaft, a manually operated pivoted hand lever, a ball fixed to said lever and positioned in said bearing, and a universal joint connecting said lever with said tumbler, whereby manual operation of said lever is adapted to mesh said intermediate gear with one of said driven gears, substantially as described.

WILLIAM C. DE ROO.
JAMES E. LARSH.